(12) United States Patent
Jiang (10) Patent No.: US 8,320,216 B2
(45) Date of Patent: Nov. 27, 2012

(54) ACTIVE SONAR SYSTEM AND ACTIVE SONAR METHOD USING FUZZY LOGIC

(75) Inventor: Qin Jiang, Oak Park, CA (US)

(73) Assignee: Raytheon Company, Waltham, MA (US)

( * ) Notice: Subject to any disclaimer, the term of this patent is extended or adjusted under 35 U.S.C. 154(b) by 387 days.

(21) Appl. No.: 12/628,246

(22) Filed: Dec. 1, 2009

(65) Prior Publication Data

US 2011/0128819 A1    Jun. 2, 2011

(51) Int. Cl.
*G01S 15/00*      (2006.01)
(52) U.S. Cl. .......................................... 367/103; 367/87
(58) Field of Classification Search ................... 367/103, 367/119, 87, 99
See application file for complete search history.

(56) References Cited

U.S. PATENT DOCUMENTS

| | | | |
|---|---|---|---|
| 4,420,824 A | 12/1983 | Weber | |
| 4,549,286 A | 10/1985 | Langeraar et al. | |
| 4,933,914 A | 6/1990 | Feintuch et al. | |
| 5,216,640 A | 6/1993 | Donald et al. | |
| 5,457,662 A | 10/1995 | Forster | |
| 5,481,505 A | 1/1996 | Donald et al. | |
| 5,914,912 A | 6/1999 | Yang | |
| 6,130,641 A | 10/2000 | Kraeutner et al. | |
| 6,424,596 B1 | 7/2002 | Donald | |
| 6,525,994 B2 | 2/2003 | Donald et al. | |
| 6,987,707 B2 * | 1/2006 | Feintuch et al. | ................ 367/99 |
| 2004/0071046 A1 | 4/2004 | Kervern et al. | |
| 2006/0007784 A1 | 1/2006 | Lerro et al. | |
| 2006/0133211 A1 | 6/2006 | Yang | |
| 2010/0128566 A1 | 5/2010 | Jiang | |
| 2011/0228639 A1 | 9/2011 | Jiang et al. | |

OTHER PUBLICATIONS

Kadambe et al.; "Cross Term Deleted Wigner Representation (CDWR) Based Signal Detection Methodologies;" Acoustics, Speech and Signal Processing, 1996; ICASSP-96; Conference Proceedings; 1996 IEEE International Conference; May 7-10, 1996; vol. 5; pp. 2583-2586.

Kadambe et al.; "Comparative study of the Cross-term Deleted Wigner and Cross Biorthogonal representations;" Signals Systems and Computers, 1997; Conference Record of the $31^{st}$ Asilomar Conference; vol. 2; Nov. 2-5, 1997; pp. 1484-1488.

Office Action dated Jul. 8, 2011 for U.S. Appl. No. 12/465,127, filed May 13, 2009; 17 pages.

Office Action dated May 3, 2011 for U.S. Appl. No. 12/313,741, filed Nov. 24, 2008; 6 pages.

Kadambe et al.; "Application of Cross-Term Deleted Wigner Representation (CDWR) for Sonar Target Detection/Classification;" Conference Record of the $32^{nd}$ Asilomar Conference on Signals, Systems and Computers, vol. 1; Nov. 1-4, 1998; pp. 822-826.

(Continued)

*Primary Examiner* — Ian Lobo (74) *Attorney, Agent, or Firm* — Daly, Crowley, Mofford & Durkee, LLP (57) ABSTRACT

A computer-implemented method of sonar processing includes identifying, with a processor, a detection having a detection probability value, the detection in a selected beam, wherein the detection is associated with a detection range cell having detection range cell data. The method also includes comparing, with the processor, the detection range cell data with range cell data from a corresponding range cell from at least one overlapping beam overlapping the selected beam. The method also includes updating, with the processor, the detection probability value based upon the comparing. A sonar system uses the above-described method. A computer readable storage medium has instructions thereon to achieve the above-described method.

18 Claims, 4 Drawing Sheets

OTHER PUBLICATIONS

Kadambe et al.; "Instantaneous Frequency Estimation Using the Cross-Term Deleted Wigner Representation (CDWR);" Proceedings of the IEEE-SP International Symposium on Time-Frequency and Time-Scale Analysis, Jun. 18-21, 1996; pp. 289-292.

Jiang et al.; Active Sonar and Active Sonal Method Using Hoise Reduction Techniques and Advanced Signal Processing Techniques; U.S. Appl. No. 12/465,127, filed May 13, 2009; 48 pages.

U.S. Office Action dated May 3, 2011; for U.S. Appl. No. 12/313,741; 6 pages.

U.S. Notice of Allowance dated Oct. 13, 2011; for U.S. Appl. No. 12/465,127; 8 pages.

Response filed Aug. 2, 2011, to Office Action dated May 3, 2011; U.S. Appl. No. 12/313,741; 17 pages.

U.S. Notice of Allowance dated Aug. 22, 2011; for U.S. Appl. No. 12/313,741; 6 pages.

\* cited by examiner

ACTIVE SONAR SYSTEM AND ACTIVE SONAR METHOD USING FUZZY LOGIC

FIELD OF THE INVENTION

This invention relates generally to active sonar systems and, more particularly, to active sonar systems and methods that provide advanced processing techniques that result in improved detection of underwater objects, for example, underwater mines.

BACKGROUND OF THE INVENTION

It is known that an underwater vessel (i.e., a submarine) generates sound as it travels through the water. The sound is generated by a variety of sources, including, but not limited to, sound generated by a submarine propulsion system, sound generated by a submarine propeller, and sound generated by a submarine electrical power generator. It is known that submarine designers attempt to reduce these and other sound sources in order to make a submarine difficult to detect by passive acoustic means, therefore remaining as covert as possible.

Some water-born objects do not emit sound, for example, underwater mines. These objects cannot be detected by the sounds they make.

While a conventional passive sonar system merely listens for sounds made by a target of interest, a conventional active sonar system transmits a burst of acoustic energy, called a "ping," which travels at the speed of sound through the water. Some of the acoustic energy reflects from objects in or on the water back toward the active sonar system. These reflections, referred to as "echoes," are received by acoustic sensors at the active sonar system. After a sufficient amount of time has passed, the active sonar system transmits another ping and repeats the above process.

Both active and passive sonar systems must operate in an environment filled with acoustic noises generated by a variety of noise sources, including, but not limited to, ships, surface waves, wind, geologic noises, and biologic noises.

Detection electronics, which forms a part of the active sonar system, performs processing upon the received echoes to improve the likelihood that only echoes from targets of interest are identified and reported to a sonar system operator. However, as described above, the undersea acoustic environment is very noisy, and despite the application of sophisticated detection processing algorithms, the active sonar system may still falsely identify random bursts of noise as targets. These false detections are referred to as "false alarms." If the consequences of reporting a false alarm are severe, then steps can be taken to further reduce a probability of the false alarms, but usually these steps also reduce the probability that a real target of interest will be detected.

A variety of approaches have been used in sonar systems to improve performance in the presence of the noisy ocean environment. For example, both active and passive sonar systems tend to do receive and/or transmit beamforming. Receive beamforming, for both passive and active sonar systems, tends to result in blocking out of directions from which noises may come. Transmit beamforming, for active sonar systems, tends to result in higher power in a transmit beam, and therefore, a stronger echo from an object in or on the water.

Another approach used in sonar systems to improve performance is a matched-filter technique, which will be understood to those of ordinary skill in the art to take a variety of forms in the time or frequency domains.

Another approach used in active sonar systems to improve performance is a "chaining algorithm" that attempts to identify echoes that appear in adjacent ping cycles at ranges consistent with a real target moving at a realistic speed.

It is known that sound can travel through the water in so-called "propagation paths," which can be non-straight paths, particularly when the propagation paths extend over appreciable distances, e.g., miles. The propagation paths can be modeled with propagation models. Some propagation models assume that the sound travels in straight propagation paths. These models are often referred to as isovelocity models, since they presume that sound travels at the same sound speed at all water depths. Other propagation models do not assume that the sound travels in straight propagation paths. These models, which are sometimes referred to as "ray trace" models, can be used to more accurately predict the sound propagation paths and the resulting sound that arrives at a point in the ocean, for example, at a sonar system that receives passive sound from an underwater target. Other propagation models accomplish the equivalent function but are less computationally convenient.

As is also known, sound that travels underwater can often take more than one propagation path. For example, sound can take a "direct propagation path" from a sound source to a sound receiver, which path may curve but not intercept the surface or bottom of the ocean. The sounds can also travel upward from the sound source, on a so-called "surface reflected path," reflecting (or scattering) from the surface of the water and traveling downward to the sound receiver. The sound can also travel downward from the sound source, on a so-called "bottom reflected path," reflecting (or scattering) from the bottom of the water basin and traveling upward to the sound receiver. The sound can also take a variety of other propagation paths, having, for example, both a surface and a bottom reflection (or scattering) or more than one surface and bottom reflection (or scattering).

Through there exist a very large number of sound propagation paths between a sound source and a sound receiver, some of the propagation paths are dominant, i.e., sound received at a sound receiver will have an intensity largely from the dominant sound paths. In particular, because sound tends to lose intensity each time it reflects or scatters from the surface or the bottom, the propagation paths having the strongest sound intensity when received at a sound receiver tend to be the direct path, the surface reflected path, and the bottom reflected path. However, a surface to bottom reflected path and a bottom to surface reflected path can also be considered as well as paths with multiple boundary contacts.

Conventional active sonar systems tend to operate with direct sound paths between the active sonar system and the target of interest. However, conventional active sonar systems also experience (i.e., receive) sound reflecting from the ocean surface and from the ocean bottom. Active sonar systems must distinguish an echo from a target from a reflection from the ocean surface or from the ocean bottom.

Conventional active sonar systems use single-beam based detection, in which target detection processing is conducted independently in each individual receive beam. For a likely detection in any one receive beam, single-beam based detection techniques do not use information in adjacent beams when generating a detection decision. Thus, conventional active sonar systems discard useful information.

It would be desirable to provide new approaches used in active sonar systems to improve performance in the presence of the noisy ocean environment. For example, it would be desirable to provide improved detection and localization of objects in the water.

SUMMARY OF THE INVENTION

The present invention provides an active sonar system and method having an improved ability to detect, with fewer false alarms, objects in the water.

When a receive beam (or more precisely, data derived therefrom) contains heavy noise and/or clutter, target signals can be corrupted by the noise such that it is very difficult for a single-beam based target detector to detect or localize a target. However, in noisy environments (or in any environment) the target information obtained from adjacent beams can be used to enhance weak target signals and to improve target detection in any one receive beam. Crossbeam correlation is one way to represent target information obtained from adjacent beams. In addition, crossbeam correlation can be used to reduce false target detections because a false target signal occurring in any one receive beam is less likely to have corresponding false target signals in adjacent receive beams, since noise is independent (and uncorrelated) from beam to beam. Hence, a value resulting from crossbeam correlation for the false target signal is likely to be very low because of no corresponding false target signals in the adjacent beams. In general, compared to single-beam based detection, multi-beam based detection can produce more accurate and robust detection results in terms of both detection rate (i.e., probability of detection of a real object) and false alarm rate.

In accordance with a first aspect of the present invention, a computer-implemented method of sonar processing includes identifying, with a processor, a detection having a detection probability value, the detection in a selected beam, wherein the detection is associated with a detection range cell having detection range cell data. The method also includes comparing, with the processor, the detection range cell data with range cell data from a corresponding range cell from at least one overlapping beam overlapping the selected beam. The method also includes updating, with the processor, the detection probability value based upon the comparing.

In some embodiments of the first aspect of the present invention the comparing includes computing a similarity function value using a similarity function that is a function of the detection range cell data and a function of the range cell data from the corresponding range cell from the at least one overlapping beam. The similarity function value provides a measure of a similarity between the detection range cell data and the range cell data from the corresponding range cell from the at least one overlapping beam.

In some embodiments of the first aspect of the present invention, the updating includes generating fuzzy logic equations that result in an updated detection probability value, and iterating the fuzzy logic equations until they converge to reach a final detection probability value.

In some embodiments of the first aspect of the present invention, the updating includes computing a local compatibility function value using a compatibility function and the similarity function value, computing an initial membership function value using a membership function, initializing the detection probability value to be related to the initial membership function value, computing a supporting function value using a supporting function, the local compatibility function value, and the detection probability value, computing a next detection probability value using a fuzzy logic equation, the detection probability value, and the supporting function value, and computing a final detection probability value by iterating the computing the supporting function value and the computing the next probability function value, and setting a final membership function value to be related to the final detection probability value.

In some embodiments of the above invention, the method also includes fusing, with the processor, using a fusing equation, the final membership function value and the similarity function value, resulting in a fusion value.

In some embodiments of the above invention, the method also includes thresholding the fusion value to provide a detection decision value.

In accordance with a second aspect of the present invention, a computer-readable storage medium having computer readable code thereon for sonar signal processing includes instructions for identifying a detection having a detection probability value, the detection in a selected beam, wherein the detection is associated with a detection range cell having detection range cell data. The computer-readable storage medium also includes instructions for comparing with the processor the detection range cell data with range cell data from a corresponding range cell from at least one overlapping beam overlapping the selected beam. The computer-readable storage medium also includes instructions for updating the detection probability value based upon the comparing.

In some embodiments of the second aspect of the present invention, the instructions for comparing include instructions for computing a similarity function value using a similarity function that is a function of the detection range cell data and a function of the range cell data from the corresponding range cell from the at least one overlapping beam, wherein the similarity function value provides a measure of a similarity between the detection range cell data and the range cell data from the corresponding range cell from the at least one overlapping beam.

In some embodiments of the second aspect of the present invention, the instructions for updating include instructions for generating fuzzy logic equations that result in an updated detection probability value, and instructions for iterating the fuzzy logic equations until they converge to reach a final detection probability value.

In some embodiments of the second aspect of the present invention, the instructions for updating include instructions for computing a local compatibility function value using a compatibility function and the similarity function value, instructions for computing an initial membership function value using a membership function, instructions for initializing the detection probability value to be related to the initial membership function value, instructions for computing a supporting function value using a supporting function, the local compatibility function value, and the detection probability value, instructions for computing a next detection probability value using a fuzzy logic equation, the detection probability value, and the supporting function value, instructions for computing a final detection probability value by iterating the computing the supporting function value and the computing the next probability function value, and instructions for setting a final membership function value to be related to the final detection probability value.

In some embodiments of the above invention, the computer-readable storage medium further includes instructions for fusing, using a fusing equation, the final membership function value and the similarity function value, resulting in a fusion value.

In some embodiments of the above invention, the computer-readable storage medium further includes instructions for thresholding the fusion value to provide a detection decision value.

In accordance with a third aspect of the present invention, a system for sonar processing includes an initial target detection processor coupled to receive beam data and configured to identify a detection having a detection probability value, the detection in a selected beam. The detection is associated with a detection range cell having detection range cell data. The system also includes a similarity processor coupled to receive the beam data, the detection range cell and the detection range cells data, configured to compare the detection range cell data with range cell data from a corresponding range cell from at least one overlapping beam overlapping the selected beam, and configured to generate a corresponding similarity function value. The similarity function value provides a measure of a similarity between the detection range cell data and the range cell data from the corresponding range cell from the at least one overlapping beam. The system also includes a target update processor coupled to receive the similarity function value and configured to update the detection probability value based upon the similarity function value.

In some embodiments of the second aspect of the present invention, the similarity processor is further configured to compute the similarity function value using a similarity function that is a function of the detection range cell data and a function of the range cell data from the corresponding range cell from the at least one overlapping beam.

In some embodiments of the second aspect of the present invention, the target update processor is further configured to generate fuzzy logic equations that result in an updated detection probability value and to iterate the fuzzy logic equations until they converge to reach a final detection probability value.

In some embodiments of the second aspect of the present invention, the target update processor is further configured to compute a local compatibility function value using a compatibility function and the similarity function value, configured to compute an initial membership function value using a membership function, configured to initialize the detection probability value to be related to the initial membership function value, configured to compute a supporting function value using a supporting function, the local compatibility function value, and the detection probability value, configured to compute a next detection probability value using a fuzzy logic equation, the detection probability value, and the supporting function value, configured to compute a final detection probability value by iterating with the computing supporting function and the computing the next probability function value, and configured to set a final membership function value to be related to the final detection probability value.

In some embodiments of the above invention, the system further includes a detection fusion processor configured to receive the similarity function value and the final membership function value, and configured to fuse, using a fusing equation, the final membership function value and the similarity function value, resulting in a fusion value.

In some embodiments of the above invention, the detection fusion processor is further configured to threshold the fusion value to provide a detection decision value.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the present invention, some terms and concepts are discussed. As used herein, the term "receive signal" refers to a signal generated by a receiving array in an active sonar system. The receive signal can be analog or digital, but an analog receive signal is used in examples herein. The receive array can generate a plurality of receive signals, each from one of a plurality of acoustic receiving elements of the receive array. In some embodiments, the elements of the receive array can each have a respective directional receive beampattern, and each can generate a beamformed receive signal. However, in other embodiments, the elements of the receive array can each have substantially omnidirectional or widely directional beampatterns.

As used herein, the term "beamformed receive signal" refers to a signal generated from one or a plurality of receive signals. The beamformed receive signal can be analog or digital, but a digital beamformed receive signal is used in examples herein. The beamformed receive signal is associated with a receive beam. The receive array can be used to generate a plurality of beamformed receive signals associated with a respective plurality of receive beams. In some embodiments, the elements of the receive array can each have a respective directional receive beampattern, and each can generate a beamformed receive signal. However, in other embodiments, the elements of the receive array can each have substantially omnidirectional or widely directional beampatterns, and the receive beams and associated beamformed receive signals can instead be generated by one of a variety of electronic beamforming techniques, which will be readily understood.

As used herein, the term "beam data" is used to describe a set of samples, e.g., digital samples, derived from a beamformed receive signal associated with one receive beam. For example, the receive signal can be converted to discrete digital samples (time samples) with an analog-to-digital converter, and then beamformed, to generate the beam data. As used herein, the term "beam sample" is used to describe one of the samples of the beam data, which is necessarily associated with one respective beam.

As used herein, the term "range cell data" is used to describe the beam data but arranged into "range cells," wherein each range cell can contain one or more of the beam samples, and wherein each range cell represents a signal delay (or perhaps a range of delays), which is equivalent to a range (or perhaps a range of ranges) in an active sonar system. In embodiments described herein, each range cell contains one beam sample, and is therefore, associated with one time delay and one range. However, in some other embodiments, range cells can contain more than one beam sample. As used herein, the term "range sample" is used synonymously with the term beam sample.

As used herein, the term "target" refers to an object in the water. The target can, for example, be an underwater mine that the below described systems and methods attempt to detect.

As used herein, the term "echo" refers to received sound that originated from a sound transmission by an active sonar system, which has bounced off of a target, and which has returned to the active sonar system and which is received by a receive array. In general, echoes, even from one target, can be received from different sound transmission paths.

As used herein, the term "target detection" refers to a detection of target information (an echo) in a beam sample associated with one receive beam. Beam data (from one beam) can contain a plurality of target detections, the plurality of target detections in different range cells representative of different target ranges, which may be representative of different targets or of the same target, for example, where echoes from the target are received from different sound transmission paths.

As used herein, the term "detection range cell" refers to a range cell that contains a beam sample (or range sample) that is likely to be representative of an echo received from a target. As used herein, the term "detection range cell data" is used to describe the range cell data within the detection range cell. In some embodiments, the detection range cell includes only one beam sample, i.e., one "detection range sample." Range cells are identified to be detection range cells by way of a "target detection."

As used herein, the term "target information" is used to mean one or more likely target detections within the beam samples associated with one or more receive beams. Target information can be associated with one target, wherein an echo is received from the target and detected in one receive beam. Target information can also be associated with one target, wherein an echo from the target is detected in a plurality receive beams. Thus the target information can contain one potential target detection, in one or in a plurality of receive beams.

Target information can also be associated with a plurality of targets, wherein echoes are received from the targets and detected in one receive beam. Target information can also be associated with a plurality of targets, wherein echoes are received from the targets and detected in a plurality of receive beams. Thus the target information can contain a plurality of potential target detections, in one or in a plurality of receive beams.

In systems and method described below, target detections from a plurality of overlapping beams are fused in a "multi-beam based detection" to provide an improved probability of detection and an improved probability of false alarm.

In systems and methods described below, a fuzzy membership function is used to represent target information. To be more precise, every range sample in a given set of beam data is associated with a fuzzy membership function that indicates a probability that the range sample contains a target echo representative of a target in the water. For a given range cell, data from different beams but in the same range cell, i.e., associated with the same range, may provide different target information. For example, in the given range cell from some receive beams, there may be range cell data representative of a strong echo signal (a target detection), but in the same range cell from other receive beams there may not be range cell data representative of a strong echo signal.

A similarity measure is described below that can be used to evaluate the consistency of target detections in corresponding same range cells from a plurality of receive beams. For overlapping receive beams, range cell data from the same range cells (same range) should be representative of the same target detections. In systems and techniques described below, local window-defined cross-correlations are used to measure the similarity of beam data between beam pairs, which can be overlapping beams. This similarity is then used to fuse target information over multiple beams.

It is possible, however, that for a given range cell, for two overlapping beams, two highly similar sets of beam data may still be representative of contradictory target detections, i.e., one receive beam may detect a real target and the other receive beam may not. To overcome this problem, as described more fully below, a relaxation labeling procedure is used, which is an optimization procedure, in order to update initial target detections based on the measure of similarity described above. This technique can achieve improved consistency between target detections from overlapping beams based upon similarity of the corresponding beam data, resulting in updated target detections. Also described more fully below, the updated target detections from multiple beams are fused by a defuzzification function.

Before described the systems and techniques of the present invention, fuzzy logic is first described below.

A fuzzy logic system is a generalized Boolean logic system arranged to accommodate partial or imprecise truth. In general, fuzzy system techniques can provide approximate solutions to engineering problems that are too complex or poorly defined to yield analytical solutions.

In fuzzy set theory, an object can be allowed to have partial membership in more than one set through so-called membership functions that map a set of objects into a membership space.

A fuzzy set can be described as follows:
if X is a collection of objects, the objects denoted generally by x, then a fuzzy set A in X is a set of ordered pairs:

$$A=\{(x,\mu_A(x))|x \in X\} \quad (1)$$

where $\mu_A(x)$ is the membership function that maps X onto the membership space.

In fuzzy logic systems, fuzzy sets are used to make decisions or to draw conclusions.

Fuzzy logic arrangements are described, for example, in C. C. Lee, "Fuzzy Logic in control systems: Fuzzy logic controller, Part I & II," *IEEE Trans. on System, Man, and Cybernetics*, vol. 20, pp. 404-435, 1990, which article is incorporate by reference herein.

A fuzzy logic arrangement generally includes four basic elements: fuzzification, fuzzy knowledge-base, fuzzy inference engine, and defuzzification. The fuzzification process transforms input data into fuzzy variables and fuzzy sets. The fuzzy knowledge-base represents human knowledge (linguistic information) about the applications by IF-THEN fuzzy statements. The fuzzy inference engine stimulates human decision-making procedures using fuzzy sets obtained from numerical input data and the fuzzy knowledge-base obtained from linguistic human knowledge. The defuzzification process transforms fuzzy outputs into crisp (nonfuzzy) data.

In practice, a major task to apply fuzzy logic to an application is to define the four basic processes based on application requirements. For different applications, the four basic process elements may be completely different.

As mentioned above, a major issue in multi-beam based detection is fusion of target information from multiple beam data. There are two types of information within beam data from a plurality of receive beam, namely, information about a target (i.e., target detections and probability of detection) and information about the similarity of the beam data among the plurality of receive beams. If these two kinds of information are consistent, i.e., if similar receive beams that are associated with similar beam data provide similar target information, the fusion of target information from the plurality of receive beams is relatively straightforward. However, due to noise and clutter, which are different from beam to beam, these two kinds of information may not be consistent. When not consistent, the target information from each receive beam can be updated such that the target information can achieve consistency with the similarity among the beam data from the plurality of receive beams. Fusion of target information can be performed using the updated target information.

In order to generate the above-described updated target information, so-called "relaxation labeling" can be applied in order to update the target information in fuzzy membership space.

Relaxation labeling is an optimization procedure widely used in computer vision to assign labels to objects. In computer vision, a major problem involves automatically labeling objects in a scene, and the labeling should be consistent within a local region or with respect to some given constraints. Relaxation labeling is one technique used to solve the problem of labeling objects in computer vision. Relaxation labeling is an iterative updating procedure, in which labels for objects are iteratively updated such that the labels satisfy a pre-defined compatibility function. Computer vision arrangements are described, for example, in Rosenfeld, A., Hummel, R., and Zucker, S., "Scene labeling by relaxation operations," *IEEE Transactions on Systems, Man and Cybernetics*, 6:420-433. 1976, which article is incorporated herein by reference.

Mathematically, the relaxation labeling procedure can be described as follows:

Let $X=\{x_1, x_2, \ldots, x_n\}$ be a set of n objects and $\Lambda=\{l_1, l_2, \ldots, l_m\}$ be a set of m labels. For each object $x_i \in X$, its labels have a probability:

$$0 \leq p_i(l) \leq 1.0 \quad (2)$$
$$\sum_{l=1}^{m} p_i(l) = 1.0$$

For a pair objects $x_i, x_j \in X$, the consistency of their labels is determined by a compatibility function $r_{ij}(l,l')$, which indicates the relative support for label l at object $x_i$ that arises from label l' at object $x_j$.

The relaxation labeling procedure iteratively updates each label at each object such that an unambiguous labeling (consistency) can be achieved. In relaxation labeling, to update the labeling of the objects, a support function for each label l at each object $x_i$ can be defined by:

$$q_i(l) = \sum_{j=1}^{n} \sum_{l'=1}^{m} r_{ij}(l,l')p_j(l') \quad (3)$$

Using the support function and current value $p_i^k(l)$, a new value $p_i^{k+1}(l)$ can be computed by the following equation:

$$p_i^{k+1}(l) = \frac{p_i^k(l)[1+q_i(l)]}{\sum_{l'=1}^{m} p_i^k(l')[1+q_i(l')]} \quad (4)$$

After a pre-determined number of iterations between equations 3 and 4, of alternatively, after convergence of the equation 4, a label with the maximal probability at each object is taken as the final label for that object. The initial probability assignment of equation 2 and the compatibility function are determined by the application. In systems and methods described below, the relaxation-labeling procedure is applied in order to update initial target information (fuzzy membership function) such that final target information associated with a selected receive beam is consistent with similarity information associated with overlapping beams for one or more given range samples.

Figure 1:
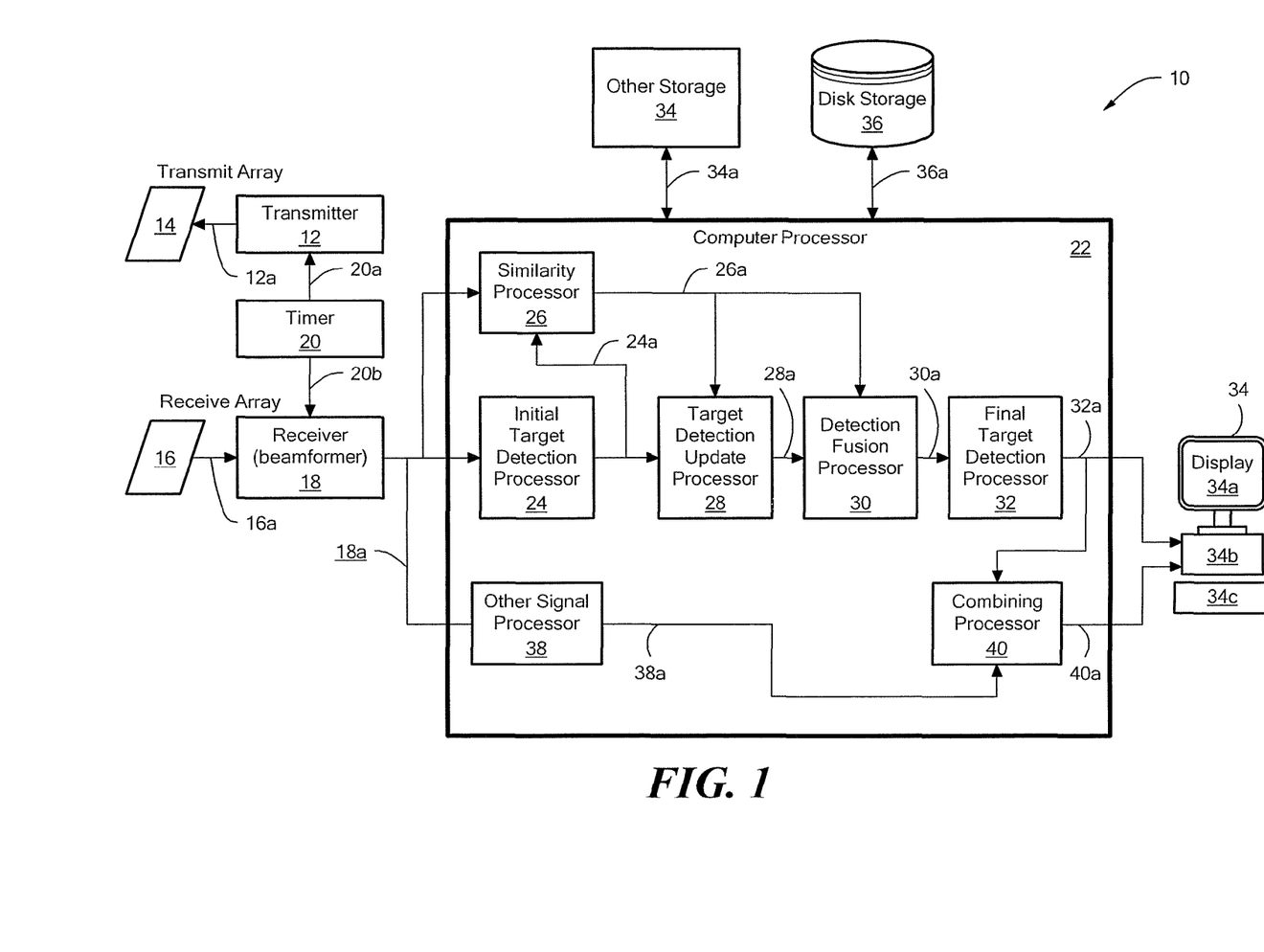
FIG. 1 is a block diagram showing sonar system.

Referring to FIG. 1, an exemplary sonar system 10 includes a transmitter 12 configured to generate one or more transmit signals 12a. A transmit array 14 disposed in the water, for example, in the ocean, is coupled to receive the one or more transmit signals 12a and configured to project sound into the water. The sound projected into the water can be a single frequency pulse, a multi-frequency pulse, a frequency modulated continuous wave (FMCW) sweep, a spread spectrum pulse (for example, a pseudo-random noise pulse), or any combination thereof.

In some arrangements, sound transmitted by the transmit array 14 is substantially omnidirectional in horizontal and vertical planes. In other arrangements, the sound transmitted by the transmit array 14 is somewhat directional in at least one of the horizontal or vertical planes, for example, limited to approximately one hundred eighty degrees. In still other arrangements, the sound transmitted by the transmit array 14 is contained in one or more directional beams, for example, beams having beamwidths of less than forty-five degrees in at least one of the horizontal or vertical planes.

The sonar system 10 also includes a receive array 16 disposed in the water and configured to receive sound propagating in the water. The receive array 16 can be in one of a variety of forms and, as described below, can be used to generate a plurality of directional receive beams, each with a respective receive beampattern, each pointing to receive sound from a different respective direction.

The receive array 16 can have a plurality of receive elements to provide a corresponding plurality of receive signals 16a. In some embodiments, each receive element of the receive array 16 can have a respective directional beampattern to provide the plurality of receive signals 16a as a plurality of beamformed receive signals. However, in other embodiments, each one of the plurality of receive element of the receive array 16 can have a substantially non-directional (i.e., omnidirectional) or widely directional beampattern, in which case, a receiver (beamformer) can be coupled to receive the plurality of receive signals 16a and configured to generate a plurality of beamformed receive signals 18a and associated plurality of receive beams.

The directional receive beams can overlap each other, which can result in an object in the water being detected (i.e., an echo being detected) in more than one receive beam.

As described above, in some embodiments, the receiver 18 can include a beamformer configured to generate the plurality of beamformed receive signals 18a, each from a different directional receive beam. However, in other embodiments, the receiver 18 does not include a beamformer and the plurality of beamformed receive signals 18a is representative of the plurality of signals 16a, but in amplified form. The plurality of beamformed receive signals 18a can be comprised of a corresponding plurality of beam data having beam samples. In some embodiments, the plurality of beamformed receive signals 18a, i.e., the plurality of beam data, can be comprised of digital beam samples (time samples) as may be generated, for example, by an analog-to-digital converter.

The sonar system 10 can include a timer 20 coupled to the transmitter 12 and to the receiver 18. The timer 20 is configured to provide timing signals 20a, 20b to result in the transmit signals 12a and the corresponding plurality of beamformed receive signals 18a in an active sonar timing pattern.

It should be understood that blocks identified as processors within computer processor 22 can be hardware processors, software modules, or any combination of hardware and software. The various processors can be distributed among different processors, or the processors can represent processes performed in one processor. Functions of the processors are briefly described here, but are more fully described below in conjunction with FIGS. 2, 3, and 3A.

The computer processor 22 can include an initial target detection processor 24 coupled to receive the plurality of beamformed receive signals 18a, i.e., beam data. For an active sonar system, it will be understood that each sequential beam sample of any one of the plurality of receive signals 18a corresponds to a range. Therefore, it will be understood that the initial target detection processor 24 can arrange samples of each one of the plurality of receive signals 18a (i.e., from each one of the directional receive beams) into a respective plurality of range cells, resulting in range cell data.

Each range cell for a particular one of the plurality of beamformed receive signals 18a (i.e., receive beams) can include one or more range samples of the particular one of the plurality of beamformed receive signals 18a. In some embodiments, the range samples are digital samples of the particular one of the plurality of receive signals 18a. In one particular embodiment, each range cell associated with the particular one of the plurality of receive signals 18a includes just one digital sample of the particular one of the plurality of receive signals 18a. Thus, samples of each one of the plurality of receive signals 18a can be arranged into a plurality of range cells and range cell data by the initial target detection processor 24.

Using range samples of the plurality of receive signals 18a, the initial target detection processor 24 is configured to generate one or more initial target detections (i.e., to identify one or more detection range cells) representative of an object in the water (a target). The one or more initial target detections can be included within one or more initial target detection data sets 24a. Each one of the one or more initial target detection data sets is associated with a respective receive beam in which an initial target detection (or more than one initial target detection) occurred.

Since each range sample of the plurality of beamformed receive signals 18a is associated with a respective directional receive beam and with a respective range to the target, the angle and range to the target can be deduced from the initial target detections. Thus, for each receive beam in which an initial target detection is made, an initial target detection data set 24a can be generated, including:
  the initial target detection(s) (true or false),
  detection range cell(s) (value(s) related to the detection range cell(s), i.e., range(s), in which the initial detection(s) occurred),
  detection range cell data (i.e., data in the detection range cell(s) in which the initial detection occurred), and
  a beam value (i.e., a value that identifies the beam in which the initial target detection occurred.

It will be understood that target detections are probabilistic. Thus, each initial target detection is associated with a probability of detection and a probability of false alarm. It is desirable to provide target detections with a high probability of detection and a low probability of false alarm. To this end, further processing is done to the initial target detections made by the initial target detection processor 24.

A similarity processor 26 is coupled to receive the plurality of beamformed receive signals 18a, coupled to receive the plurality of initial target detection data sets 24a, and configured to generate similarity function values 26a. Similarity function values are further described below in conjunction with FIGS. 2, 3A, and 3A. However, let it suffice here to say that, for each one of the initial target detection data sets 26a, which is associated with a respective receive beam in which an initial target detection is made, the similarity processor 26 is configured to generate similarity function values 26a that represent how similar the beam data from the beam in which the initial target detection is made is to beam data in one or more other beams that overlap the beam in which the initial target detection is made.

A target detection update processor 28 is coupled to receive the initial target detection data sets 24a, coupled to receive the similarity function values 26a, and configured to generate final membership function values 28a. Each final membership function value is associated with a respective one of the initial target detections and therefore with a respective one of the receive beams and with a respective one of the range cells. Membership functions are more fully described below.

A detection fusion processor is coupled to receive the final membership function values 28a, coupled to receive the similarity function values 26a, and configured to generate fused target data values 30a, which are essentially comprised of final probabilities of detection for each one of the target detections. Each fused target data value is also associated with a respective one of the initial target detections and therefore with a respective one of the receive beams and with a respective one of the range cells.

A final target detection processor 32 is coupled to receive the fused target detection values 30a and configured to generate final target detection decisions within final target detection data sets 32a. The final target detection decisions are essentially comprised of thresholded final probabilities of detection for each one of the target detections, resulting in a detection or a no detection decision for each one of the initial target detections.

Some data from the initial target detection data sets 24a can be passed through the target detection update processor 28, through the detection fusion processor 30, and through the final target detection processor 32, so that the final target detection data sets 32a can include:
  the final target detection(s) (true or false),
  detection range cell(s) (value(s) related to the detection range cell(s), i.e., range(s), in which the final detection(s) occurred),
  detection range cell data (i.e., data in the detection range cell(s) in which the final detection occurred), and
  a beam value (i.e., a value that identifies the beam in which the final target detection occurred.

It will be recognized that the final target detection data sets 32a essentially represent a target detection and localization signal 32a, having both target detection and target localization (range and bearing) information. Depth can also sometimes be deduced from the bearing (beam angle) information.

A computer 34 can be coupled to receive the final target detection data sets 32a. The computer 34 can include a graphical display 34a, a processing unit 34b, and a user input device 34c, for example, a keyboard. The computer 32 can be coupled to receive the detection and localization signal 32a and configured to display detection and localization signal information on the display 34a in accordance with the detection and localization signal 32a.

In some embodiments, the computer processor 22 can also include an other detection processor 38 coupled to receive the plurality of beamformed receive signals 18a and configured to generate another one or more target detections 38a. The other signal processor 38 can include one of a variety of conventional techniques, for example, a matched filter. The other signal processor 38 can be configured to generate another target detection and localization signal 38a.

The computer processor 22 can also include a combining processor 40 coupled to receive the target detection and localization signals 32a, 38a and configured to generate a combined detection and localization signal 40. The computer 34 can be coupled to receive the combined detection and localization signal 40a and configured to display combined detection and localization signal information on the display 34a in accordance with the combined detection and localization signal 40a.

In some embodiments the computer processor 22 does not include the other signal processing processor 38, or the combining processor 40, in which case the computer 34 is coupled to receive only the target detection and localization signal 32a.

In some embodiments, the computer processor 22 can be coupled to other storage apparatus, for example, a disk storage 36 and other storage 34, for example, random access memory.

It will be understood that the processors 24, 26, 28, 38, 40, 30 within the computer processor 22 can be software modules stored within associated program memory, which can be random access memory within the computer processor 22, and the random access memory can be loaded with instructions that originate from the disk storage 36.

Figure 2:
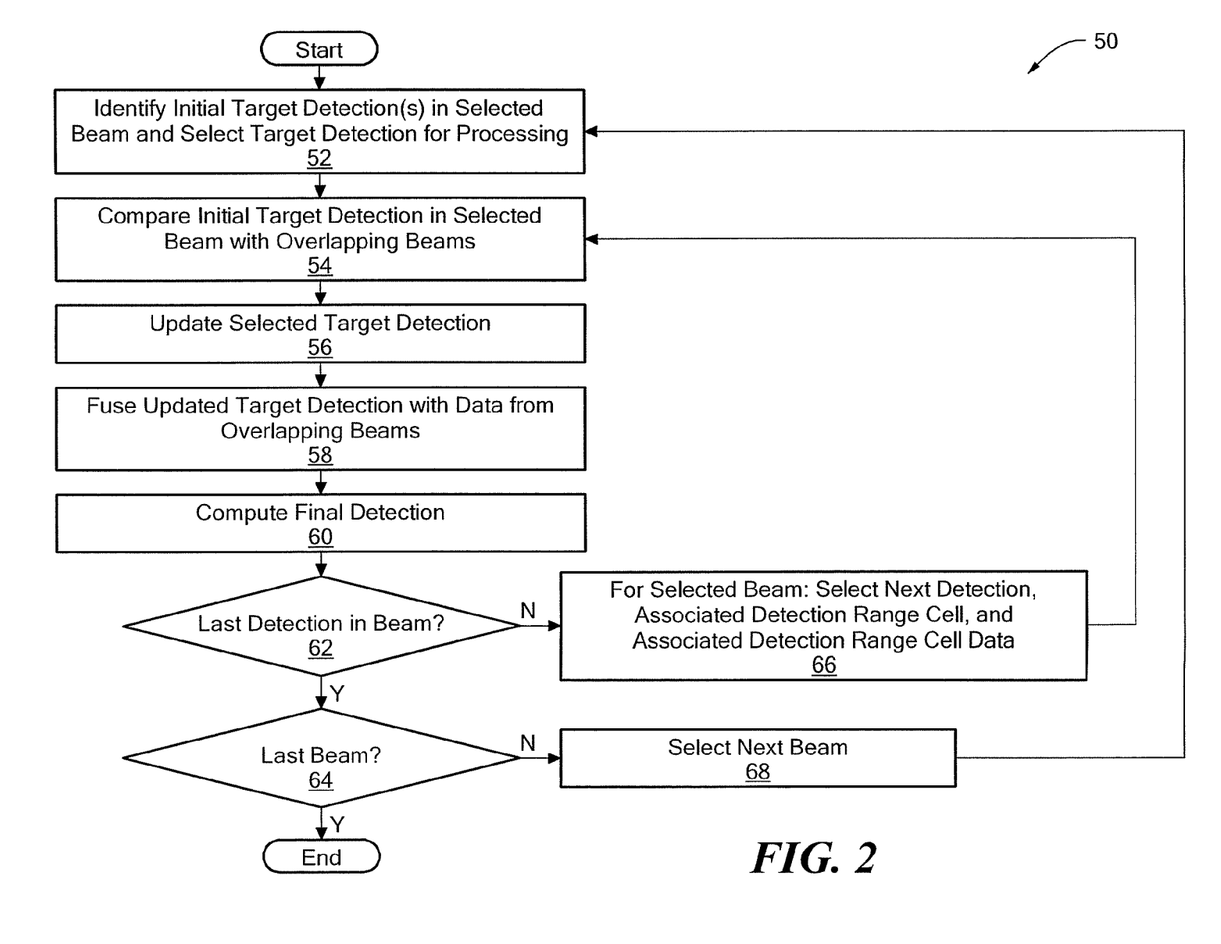
FIG. 2 is a flow chart showing a process that may be implemented by the sonar system of FIG. 1.
Figure 3:
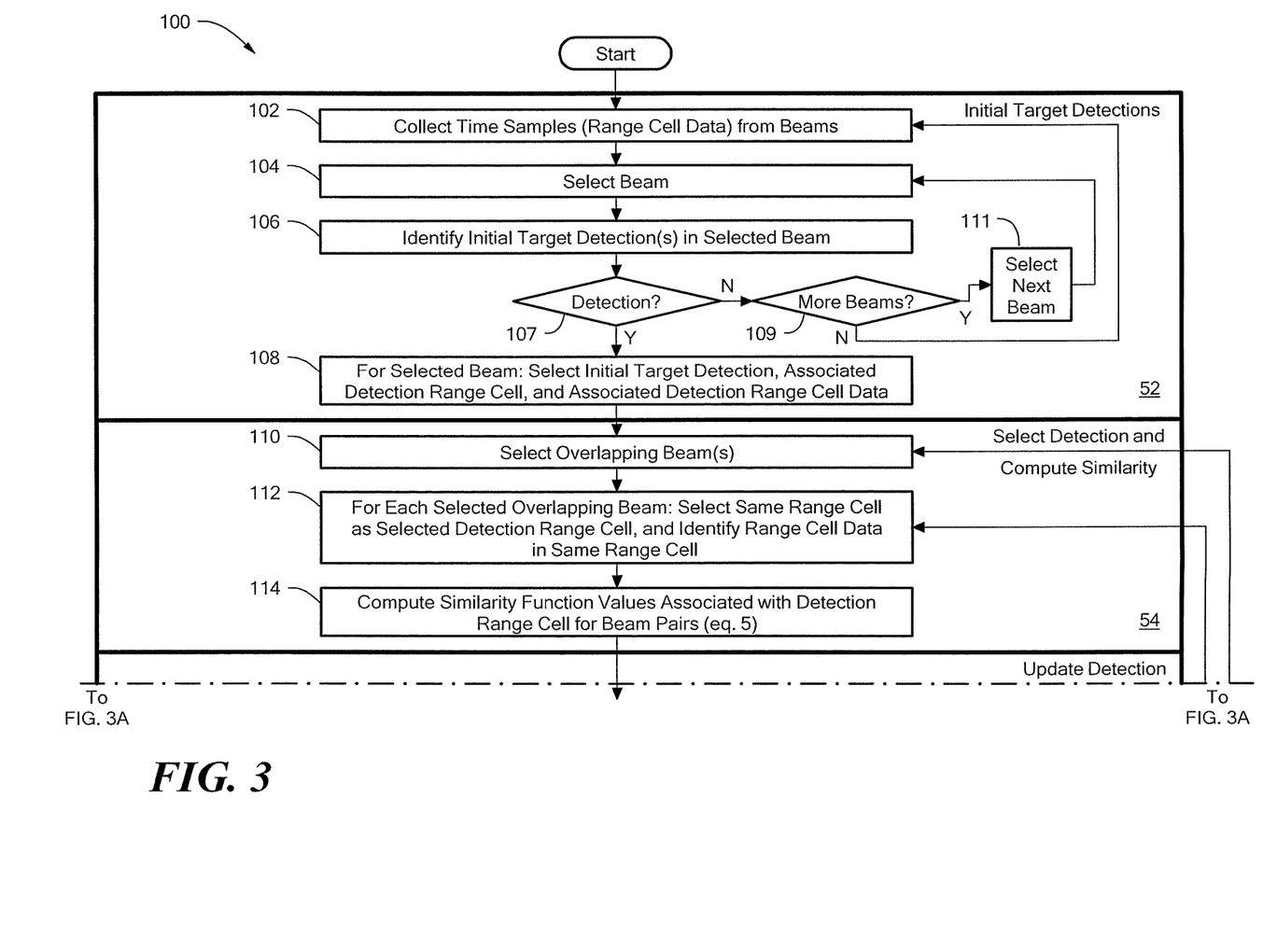
FIGS. 3 and 3A are flowcharts showing further details of the process of FIG. 2.
Figure 3A:
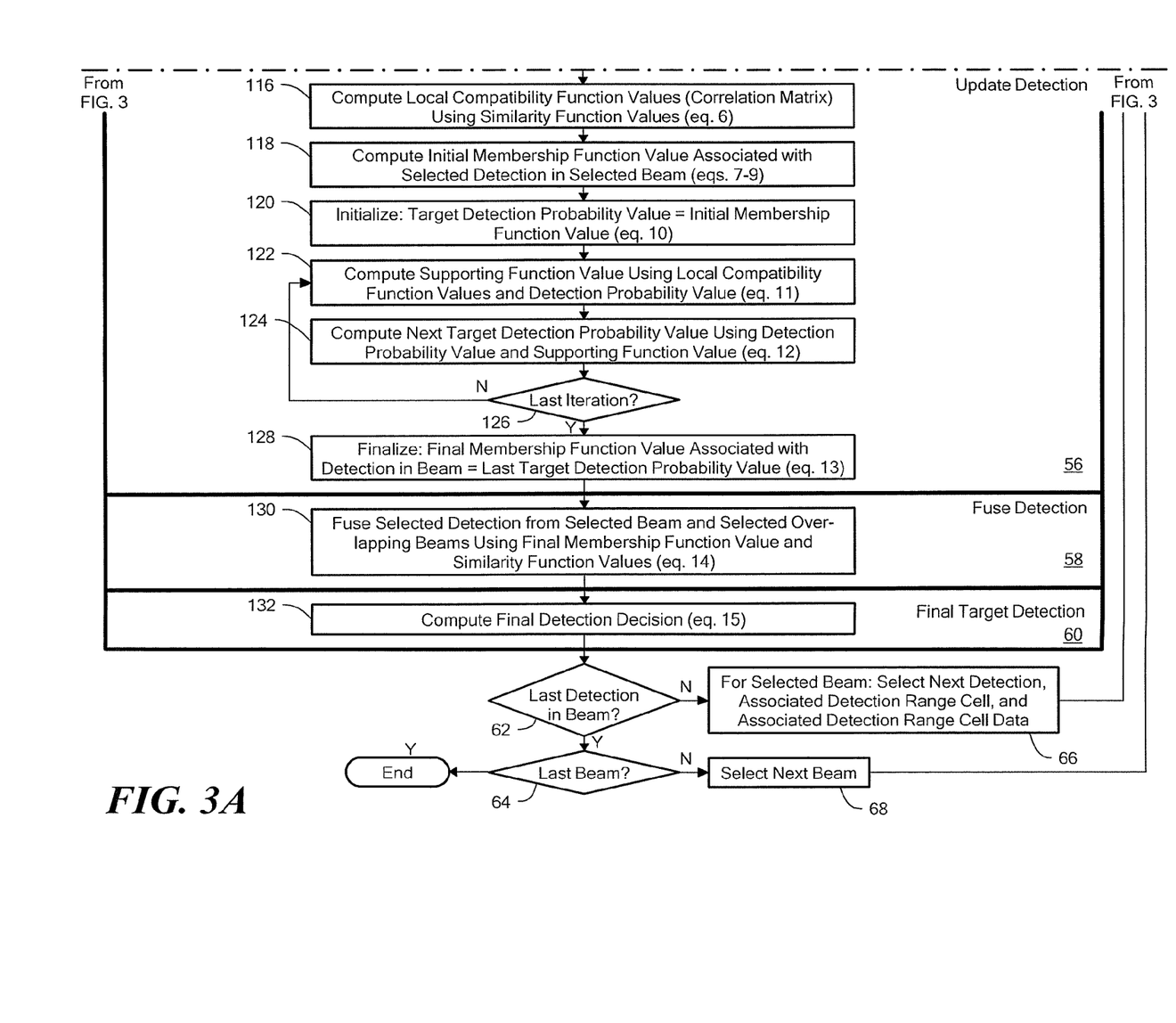

It should be appreciated that FIGS. 2, 3, and 3A show flowcharts corresponding to the below contemplated technique which would be implemented in sonar system 10 (FIG. 1). Rectangular elements (typified by element 52 in FIG. 2), herein denoted "processing blocks," represent computer software instructions or groups of instructions. Diamond shaped elements (typified by element 62 in FIG. 2), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring to FIG. 2, an exemplary method 50 begins at block 52. At block 52, one or more initial target detections are made in one of a plurality of receive beams and one of the identified initial target detections is selected. The functions of block 52 can be performed, for example, by the initial target detection processor 24 of FIG. 1.

At block 54, using the initial target detection provided at block 52, the initial target detection can be compared with beams that overlap the beam in which the initial target detection was made, resulting in a similarity function value. The functions of block 54 can be performed, for example, by the similarity processor 26 of FIG. 1.

At block 56, using the initial target detection and the similarity function value, the initial target detection can be updated to provide a final membership function value, which is related to a probability of detection associated with the initial target detection. The functions of block 56 can be performed, for example, by the target detection update processor 28 of FIG. 1.

At block 58, the final membership function value from block 56 is fused with the similarity function value of block 54 to generate a fused detection value related to the initial target detection generated at block 52. The functions of block 58 can be performed, for example, by the detection fusion processor 30 of FIG. 1.

At block 60, using the fused detection value, a final target detection is generated. The functions of block 60 can be performed, for example, by the final target detection processor 32 of FIG. 1.

At block 62, if the target detection being processed is the last target detection in the selected receive beam, then the process continues to block 64.

At block 64, if the beam being processed is the last beam, then the process ends until a next ping cycle is generated, at which time the process 50 repeats.

If, at block 62, the target detection being processed in not the last target detection in the selected receive beam, then another one of the target detections in the selected receive beam is selected at block 66, and the process returns to block 54.

If, at block 64, the receive beam being processed is not the last receive beam, then the next receive beam is selected at block 68 and the process returns to block 52.

Further details of the process 52 are discussed below in conjunction with FIGS. 3 and 3A.

Referring now to FIGS. 3 and 3A, in which like elements of FIG. 2 are shown having like reference designations, blocks 52-68 of FIG. 2 are again shown, but in greater detail. A process 100 begins at block 102, where beamformed time samples, which can be digitized time samples, are collected for each one of a plurality of receive beams. Collection of the beamformed time samples can be performed, for example, by the receiver 18 of FIG. 1. The collected beamformed time samples can be associated with a set of receive beams in one "ping cycle" of an acoustic sonar system.

At block 104, beamformed samples (time samples) associated with one of the receive beams are selected, for example, by the initial target detection processor 24 of FIG. 1.

At block 106, one or more initial target detections (echoes) are identified in the selected receive beam. Initial target detection can be made in a variety of ways. In some embodiments, for each selected range cell (e.g., for each selected beamformed sample) a local noise is first identified by measuring a noise power in surrounding range cells. In some embodiments, the noise power is calculated by averaging among the surrounding range cells. Then, a threshold based upon the computed noise can be applied to the selected range cell. The threshold can, for example, be a predetermined number of dB about the calculated noise power.

With the above-identified technique, range cells for which the signal power in the selected range cell are more than the predetermined amount above the calculated noise are deemed to be initial target detections.

The technique can be applied to all of the beamformed samples in the selected receive beam. As described above, there can be one or more than one target detection in the beam data associated with the selected beam, which is selected at block 104.

At block 107, if an initial target detection is made in the selected receive beam, then the process continues to block 108. However, if no target detection is made in the selected receive beam, then the process proceeds to block 109, where, if there are more receive beams in the set of receive beams, then the process continues to block 111, where a next receive beam is selected and the process returns to block 104. If, however, at block 109, there are no more receive beams, the process returns to block 102, where beamformed samples from another set of receive beams in another ping cycle of the active sonar system are collected.

At block 108, one of the initial target detections in the selected receive beam is selected for further processing. The initial target detection is associated with a detection range cell, i.e., a range to the target, and also with the selected receive beam, which is representative of an azimuth angle and an elevation angle to the target. The detection range cell includes detection range cell data, i.e., the original beam-formed time sample (data).

At block 110, beams overlapping the selected beam are selected. Acoustic receive beams in an active sonar system tend to overlap each other to some extent. This overlap can result in an echo from a target being received in more than one receive beam. The reception in multiple receive beams provides information that can be used to improve a probability of detection and to reduce a probability of false alarm with regard to final detections described below.

At block 112, in each one of the selected overlapping beams, a respective same range cell is identified that corresponds to the detection range cell in the selected receive beam being processed. Each one of the same range cells in the overlapping beams has respective range cell data.

At block 114, in order to determine if two beams receive the same target signal at a given range cell, a similarity function can be used to measure a crossbeam correlation between the two beams. Let $s_1$ and $s_2$ be two beamformed receive signals (i.e., beam data) corresponding to a local window (i.e., a plurality of range cell data) centered at a given range cell (e.g., a detection range cell) in beam data from two beams (e.g., two overlapping beams). The similarity function can be of the form:

$$c(s_1, s_2) = \frac{\langle s_1, s_2 \rangle}{\sqrt{\langle s_1, s_1 \rangle} \sqrt{\langle s_2, s_2 \rangle}} \tag{5}$$

where $\langle x,y \rangle$ denotes the inner product of x and y.

The similarity function, $c(s_1,s_2)$, provides a measure of the cross-correlation between the two signals, i.e., between range cell data in the same range cell between two receive beams. If the two range cells are highly correlated, the two beams that contain the two range cells most likely received the same target signal at the same range cell.

The similarity function provides similarity function values, each similarity function value associated with a receive beam pair including the selected receive beam being processed and one or more overlapping receive beams.

At block 116, using the similarity function values, local compatibility function values can be computed using a compatibility function.

The local compatibility function between object $a_i$ and object $a_j$ can be defined by:

$$r_{ij}(t,nt) = 1 - c_{ij}$$

$$r_{ij}(t,t) = c_{ij}$$

$$r_{ij}(nt,nt) = c_{ij} \tag{6}$$

where $c_{ij}$ is the correlation coefficient between object $a_i$ and object $a_j$ defined by equation 5 above. The function $r_{ij}(t,nt)$ is related to the compatibility of target $a_i$ and non-target $a_j$.

In the active sonar system and method described herein, the objects of the above-described equation 6 are the range samples and the labels are target and non-target labels.

At block 118, an initial membership function value associated with the selected initial target detection (and target detection range cell with range cell data therein) is computed with a membership function described below.

For a given range sample (range cell data) a(r), a local window can be used to collect a set of noise samples, ns(r), r=1, 2, ..., k. A target membership function, $\mu_t(a)$, can be described by:

$$\mu_t(a) = \begin{cases} 1, & q(a) \geq 1 \\ q(a), & 0 < q(a) < 1 \\ 0, & q(a) \leq 0 \end{cases} \tag{7}$$

where $$q(a) = \frac{a(r) - \bar{n}}{\max\_n - \bar{n}} \tag{8}$$

and where $\bar{n} = \text{mean}(ns(r))$ and $\max\_n = \max(ns(r))$

A non-target membership function, $\mu_{nt}(a)$, can be described by:

$$\mu_{nt}(a) = 1.0 - \mu_t(a) \tag{9}$$

It should be apparent from the above equations 7-9, that the initial target detections determined at block 106 can be related to initial probabilities of detection, q(a).

At block 120, a target detection probability value (probability of detection) is initialized.

In the active sonar system and method described herein, the objects of the above-described fuzzy logic are the range samples, and the labels are target and non-target labels. The probability of the labels being of a particular type is the fuzzy membership function. The local compatibility function can be defined by the above-described crossbeam correlation between the range samples. The labeling procedure can be described as follows:

Let $A = \{a_i(r), i=1, 2, 3 \ldots, m\}$ be a set of objects and $\Lambda = \{nt\}$ be the set of labels (t stands for target and nt stands for non-target). The initial probabilities for the labels are given by:

$$p_i^0(t) = \mu_t(a_i(r))$$

$$p_i^0(nt) = \mu_{nt}(a_i(r)) \tag{10}$$

At block 122, a supporting function can be used to compute a supporting function value using the local compatibility function values and the detection probability value. An iterative updating procedure to the probabilities is given as below.

For an object $a_i$, n=0, the supporting function, $q_i(\lambda)$, can calculated by a relationship having a form the same as or similar to equation 3 above.

$$q_i(\lambda) = \sum_{j=1}^{m} \sum_{l \in (t,nt)} r_{ij}(\lambda, l) * p_j^n(l) \tag{11}$$

At block 124, a next probability of detection can be computed by an updating function having a form the same as or similar to equation 4 above.

$$p_i^{n+1}(\lambda) = \frac{p_i^n(\lambda) * [1 + q_i(\lambda)]}{\sum_{l=1}^{2} p_i^n(l) * [1 + q_i(l)]} \tag{12}$$

Equations 11 and 12 can be iterated a predetermined number of times via a block 126 to arrive at a final probability of detection. Alternatively, the number of iterations can be determined by a convergence of equation 12.

At block 126, if the iteration is the last iteration, then the process 100 continues to block 128.

At block 128, a final membership function value is determined as:

$$\mu_t(a_i(r)) = p_i^{n+1}(t)$$

$$\mu_{nt}(a_i(r)) = p_i^{n+1}(nt) \qquad (13)$$

At block 130, the selected beam and the overlapping beams are "fused" using the final membership function values of equation 13 and the similarity function values of equation 5. After the membership function updating of block 128, it is expected that the membership function values are consistent with the crossbeam correlations among the adjacent beam data. Then, a target from the selected beam and the overlapping beams information (i.e., the target detection range cell and the same range cells in the overlapping beams) can be combined to make an updated target detection decision, which is completed by the defuzzification process. It is possible to achieve a detection result for every adjacent beams, but the below process is performs decision fusion in order to result in a unique detection decision associated with the selected beam the overlapping beams together.

In order to achieve the fusion of data, a defuzzification function can be given by:

$$y_i = \begin{cases} 1, & \mu_t^i \geq 1 \\ \dfrac{\mu_t^i + \sum_j c_{ij} * \mu_t^j}{2}, & \mu_t^i < 1 \end{cases} \qquad (14)$$

where $\mu_t^i = \mu_t(a_i)$.

The defuzzification function (equation 14) is a nonlinear function. In general, the defuzzification function contains all membership functions. However, the goal is to detect targets, and the target membership function is more important in active sonar applications than the non-target membership function. Therefore, only the target membership function, $\mu_t^i$, is used in the defuzzification function.

At block 132, a final detection decision can be made. For example, the final detection decision can be made by a decision function of the form:

$$D(a_i) = \begin{cases} 1, & y_i \geq \eta \\ 0, & y_i < \eta \end{cases} \qquad (15)$$

where the parameter $\eta$ is a threshold value.

For the original target detection range cell identified at blocks 106-108, $D(a_i)=1$ for a target detection range sample and $D(a_i)=0$ for a non-target detection range sample. Thus, a target detection range sample initially identified to be indicative of a target can either be verified by the above process, or it can be overturned by the above process.

As described above in conjunction with FIG. 2, the process 100 loops over target detections in the selected receive beam by way of blocks 62 and 66. The process 100 also loops over the receive beams by way of blocks 64 and 68.

While the discussion of FIGS. 3 and 3A identifies particular equations that can be used to provide fuzzification and defuzzification in order to combine information from overlapping beams, it should be appreciated that other equations can be used. Furthermore, while combination of information from overlapping receive beams is shown and described, it is also possible to combine information from non-overlapping beams, for example, in situations where an echo will be received from different sound paths.

Having described preferred embodiments of the invention it will now become apparent to those of ordinary skill in the art that other embodiments incorporating these concepts may be used. Additionally, the software included as part of the invention may be embodied in a computer program product that includes a computer readable storage medium. For example, such a computer readable storage medium can include a readable memory device, such as a hard drive device, a CD-ROM, a DVD-ROM, or a computer diskette, having computer readable program code segments stored thereon. A computer readable transmission medium can include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A computer-implemented method of sonar processing, comprising:
    identifying, with a processor, a detection of an object in water. the detection having a detection probability value, the detection in a selected beam, wherein the detection is associated with a detection range cell having detection range cell data;
    comparing, with the processor, the detection range cell data with range cell data from a corresponding range cell from at least one overlapping beam overlapping the selected beam;
    updating, with the processor, the detection probability value based upon the comparing: and
    generating display data in accordance with the detection and in accordance with the updated probability value.

2. The method of claim 1, wherein the comparing comprises:
    computing a similarity function value using a similarity function that is a function of the detection range cell data and a function of the range cell data from the corresponding range cell from the at least one overlapping beam, wherein the similarity function value provides a measure of a similarity between the detection range cell data and the range cell data from the corresponding range cell from the at least one overlapping beam.

3. The method of claim 1, wherein the updating comprises:
    generating fuzzy logic equations that result in an updated detection probability value; and
    iterating the fuzzy logic equations until they converge to reach a final detection probability value.

4. The method of claim 1, wherein the updating comprises:
    computing a local compatibility function value using a compatibility function and the similarity function value;
    computing an initial membership function value using a membership function;
    initializing the detection probability value to be related to the initial membership function value;
    computing a supporting function value using a supporting function, the local compatibility function value, and the detection probability value;

computing a next detection probability value using a fuzzy logic equation, the detection probability value, and the supporting function value;

computing a final detection probability value by iterating the computing the supporting function value and the computing the next probability function value; and setting a final membership function value to be related to the final detection probability value.

5. The method of claim 4, further comprising:
fusing, with the processor, using a fusing equation, the final membership function value and the similarity function value, resulting in a fusion value.

6. The method of claim 5, further comprising:
thresholding the fusion value to provide a detection decision value.

7. A computer-readable storage medium having computer readable code thereon for sonar signal processing, comprising:

instructions for identifying a detection of an object in water, the detection having a detection probability value, the detection in a selected beam, wherein the detection is associated with a detection range cell having detection range cell data;

instructions for comparing with the processor the detection range cell data with range cell data from a corresponding range cell from at least one overlapping beam overlapping the selected beam;

instructions for updating the detection probability value based upon the comparing; and instructions for generating display data in accordance with the detection and in accordance with the updated probability value.

8. The computer-readable storage medium of claim 7, wherein the instructions for comparing comprise:

instructions for computing a similarity function value using a similarity function that is a function of the detection range cell data and a function of the range cell data from the corresponding range cell from the at least one overlapping beam, wherein the similarity function value provides a measure of a similarity between the detection range cell data and the range cell data from the corresponding range cell from the at least one overlapping beam.

9. The computer-readable storage medium of claim 7, wherein the instructions for updating comprise:

instructions for generating fuzzy logic equations that result in an updated detection probability value; and instructions for iterating the fuzzy logic equations until they converge to reach a final detection probability value.

10. The computer-readable storage medium of claim 7, wherein the instructions for updating comprise:

instructions for computing a local compatibility function value using a compatibility function and the similarity function value;

instructions for computing an initial membership function value using a membership function;

instructions for initializing the detection probability value to be related to the initial membership function value;

instructions for computing a supporting function value using a supporting function, the local compatibility function value, and the detection probability value;

instructions for computing a next detection probability value using a fuzzy logic equation, the detection probability value, and the supporting function value;

instructions for computing a final detection probability value by iterating the computing the supporting function value and the computing the next probability function value; and instructions for setting a final membership function value to be related to the final detection probability value.

11. The computer-readable storage medium of claim 10, further comprising:

instructions for fusing, using a fusing equation, the final membership function value and the similarity function value, resulting in a fusion value.

12. The computer-readable storage medium of claim 11, further comprising:

instructions for thresholding the fusion value to provide a detection decision value.

13. A system for sonar processing, comprising:

an initial target detection processor coupled to receive beam data and configured to identify a detection of an object in water, the detection having a detection probability value, the detection in a selected beam, wherein the detection is associated with a detection range cell having detection range cell data;

a similarity processor coupled to receive the beam data, the detection range cell and the detection range cells data, configured to compare the detection range cell data with range cell data from a corresponding range cell from at least one overlapping beam overlapping the selected beam, and configured to generate a corresponding similarity function value, wherein the similarity function value provides a measure of a similarity between the detection range cell data and the range cell data from the corresponding range cell from the at least one overlapping beam; and a target update processor coupled to receive the similarity function value and configured to update the detection probability value based upon the similarity function value.

14. The system of claim 13, wherein the similarity processor is further configured to compute the similarity function value using a similarity function that is a function of the detection range cell data and a function of the range cell data from the corresponding range cell from the at least one overlapping beam.

15. The system of claim 13, wherein the target update processor is further configured to generate fuzzy logic equations that result in an updated detection probability value and to iterate the fuzzy logic equations until they converge to reach a final detection probability value.

16. The system of claim 13, wherein the target update processor is further configured to compute a local compatibility function value using a compatibility function and the similarity function value, configured to compute an initial membership function value using a membership function, configured to initialize the detection probability value to be related to the initial membership function value, configured to compute a supporting function value using a supporting function, the local compatibility function value, and the detection probability value, configured to compute a next detection probability value using a fuzzy logic equation, the detection probability value, and the supporting function value, configured to compute a final detection probability value by iterating with the computing supporting function and the computing the next probability function value, and configured to set a final membership function value to be related to the final detection probability value.

17. The system of claim 16, further comprising:
a detection fusion processor configured to receive the similarity function value and the final membership function value, and configured to fuse, using a fusing equation, the final membership function value and the similarity function value, resulting in a fusion value.

18. The system of claim 17, wherein the detection fusion processor is further configured to threshold the fusion value to provide a detection decision value.

* * * * *